(12) United States Patent
Smith

(10) Patent No.: US 6,840,549 B1
(45) Date of Patent: Jan. 11, 2005

(54) THREADED RISER ADAPTOR FOR ATTACHING A STRUCTURE TO A RISER

(76) Inventor: Philip E. Smith, 3732 Electro Way, Redding, CA (US) 96002

( * ) Notice: Subject to any disclaimer, the term of this patent is extended or adjusted under 35 U.S.C. 154(b) by 0 days.

(21) Appl. No.: 10/405,261

(22) Filed: Apr. 1, 2003

(51) Int. Cl.[7] .............................................. F16L 15/02
(52) U.S. Cl. ................ 285/334.1; 285/15; 285/148.19; 285/148.21
(58) Field of Search .................... 285/334.1, 148.19, 285/148.21, 15, 354

(56) References Cited

U.S. PATENT DOCUMENTS

| | | | | |
|---|---|---|---|---|
| 176,796 A | * | 5/1876 | Martin | 285/32 |
| 196,084 A | * | 10/1877 | Guyer | 285/148.11 |
| 797,152 A | * | 8/1905 | Sheckler | 285/12 |
| 1,325,147 A | * | 12/1919 | Donnelly | 285/125.1 |
| 1,496,708 A | * | 6/1924 | Gottsch | 285/46 |
| 2,702,715 A | * | 2/1955 | Andrews | 285/32 |
| 2,906,152 A | * | 9/1959 | Brase | 81/53.2 |
| 4,595,217 A | * | 6/1986 | Siegel | 285/25 |
| 4,696,330 A | | 9/1987 | Raudman et al. | |
| 4,708,370 A | * | 11/1987 | Todd | 285/12 |
| 5,496,076 A | * | 3/1996 | Lin | 285/110 |
| 6,006,961 A | * | 12/1999 | Wark | 222/527 |
| 6,209,926 B1 | * | 4/2001 | Mastro | 285/32 |
| 6,209,929 B1 | * | 4/2001 | Ikegami et al. | 285/139.2 |
| 6,517,356 B1 | | 2/2003 | Smith | |

* cited by examiner

*Primary Examiner*—Eric K. Nicholson
(74) *Attorney, Agent, or Firm*—Thomas R. Lampe

(57) ABSTRACT

A threaded riser adaptor is threadedly engaged to a liquid storage tank riser and a structure to provide a liquid-tight seal between the riser and structure. The adaptor is particularly useful when employed with field threaded risers.

2 Claims, 2 Drawing Sheets

THREADED RISER ADAPTOR FOR ATTACHING A STRUCTURE TO A RISER

TECHNICAL FIELD

This invention relates to a threaded riser adaptor for attaching a structure to an externally threaded upper riser end of a hollow riser leading to an underground liquid storage tank, for example a tank employed to store gasoline or other liquid fuels.

BACKGROUND OF THE INVENTION

Liquid fuel storage tanks deployed underground have associated with them one or more risers or pipes leading to an above ground location. A riser is employed to fill the tank.

Various structures such as tanker truck nozzle receptacles (an example being the swivel adaptor/receptacle shown in my U.S. Pat. No. 6,517,356), and spill containment vessels (an example being the spill containment system shown in U.S. Pat. No. 4,696,330 of which I am a co-inventor) are typically threadedly engaged with an upper threaded end of the riser.

It is important that a fluid-tight connection be established between the upper riser end and the structure. This becomes a problem when, as is often the case, the upper end of the riser is "field made", that is, fabricated on site. Often the upper distal ends of "field made" risers are rough or irregular. Non-field threaded upper distal ends can also be irregular or damaged. In such circumstances it is difficult, and in some cases impossible, to establish a fluid-tight sealing surface between the riser and structure threadedly engaged therewith.

DISCLOSURE OF INVENTION

This invention relates to a relatively simple, inexpensive arrangement for producing a true sealing surface at the top of a field threaded or damaged riser.

The threaded riser adaptor of the present invention is for attaching a structure to an externally threaded upper riser end of a hollow riser leading to an underground liquid storage tank.

The threaded riser adaptor has an upper externally threaded riser adaptor portion for threaded engagement with internal threads of the structure, the top rim of the upper externally threaded riser adaptor portion forming a first liquid-tight seal with the structure. The adaptor also includes a lower internally threaded riser adaptor portion for receiving the external threads of the externally threaded upper riser end and for securing the threaded riser adaptor to the riser. The threaded riser adaptor defines a liquid passageway for communication with the interior of the riser. The threads of the externally threaded upper riser end and the threads of the lower internally threaded riser adaptor portion are cooperable to form a second liquid tight seal.

Other features, advantages and objects of the present invention will become apparent with reference to the following description and accompanying drawings.

BEST MODE FOR CARRYING OUT THE INVENTION

Figure 1:
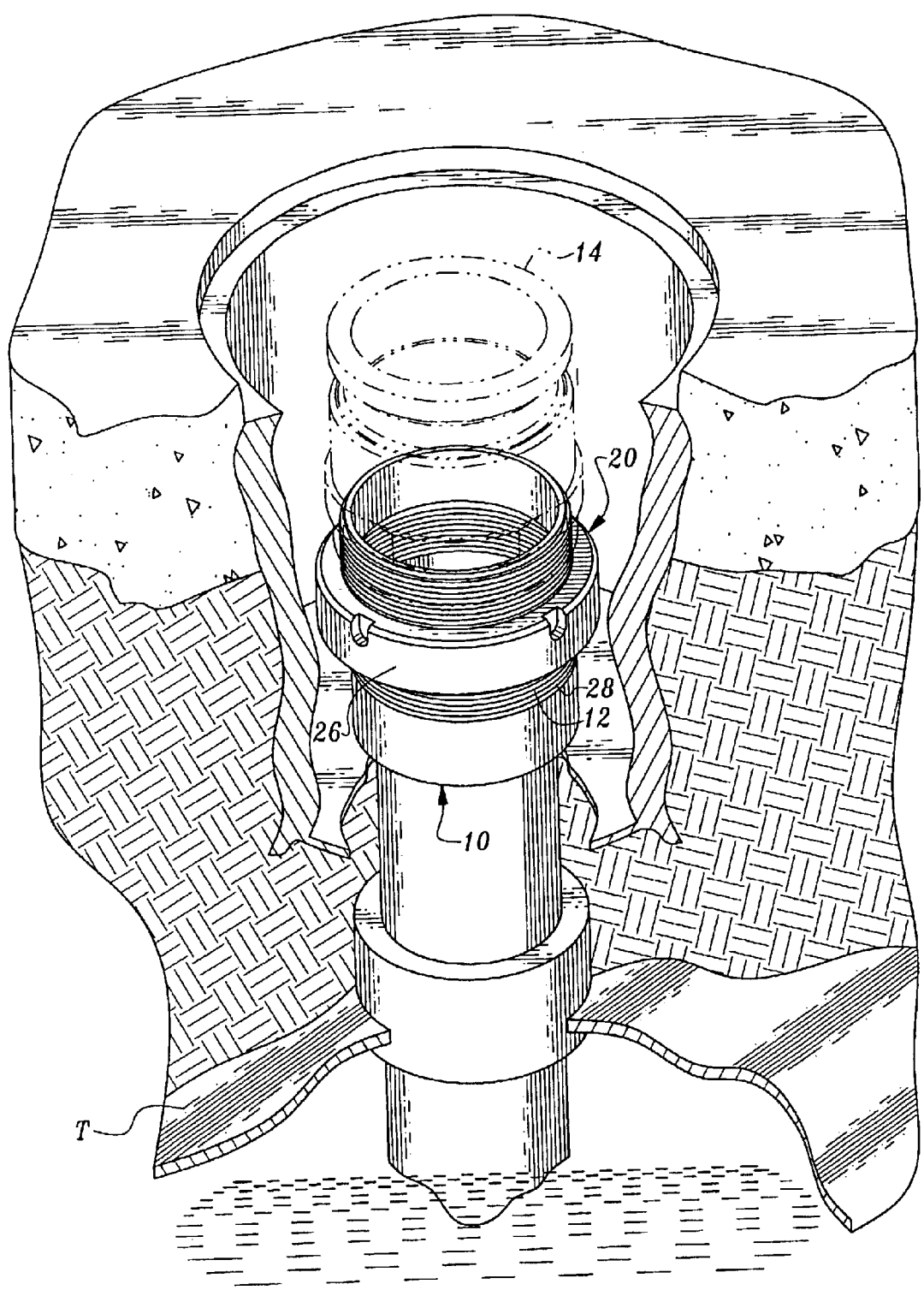
FIG. 1 is a perspective view of a preferred form of riser adaptor constructed in accordance with the teachings of the present invention installed on a riser leading to an underground liquid fuel tank, swivel nozzle engagement structure attached to the adaptor being shown in phantom.

Referring now to the drawings, a hollow riser 10 having an externally threaded upper riser end 12 is illustrated. The riser, as is conventional, leads to an underground liquid storage tank T. The threads employed at the upper riser end are tapered, threaded pipe threads (National Pipe Threads, also known as NPT).

Figure 2:
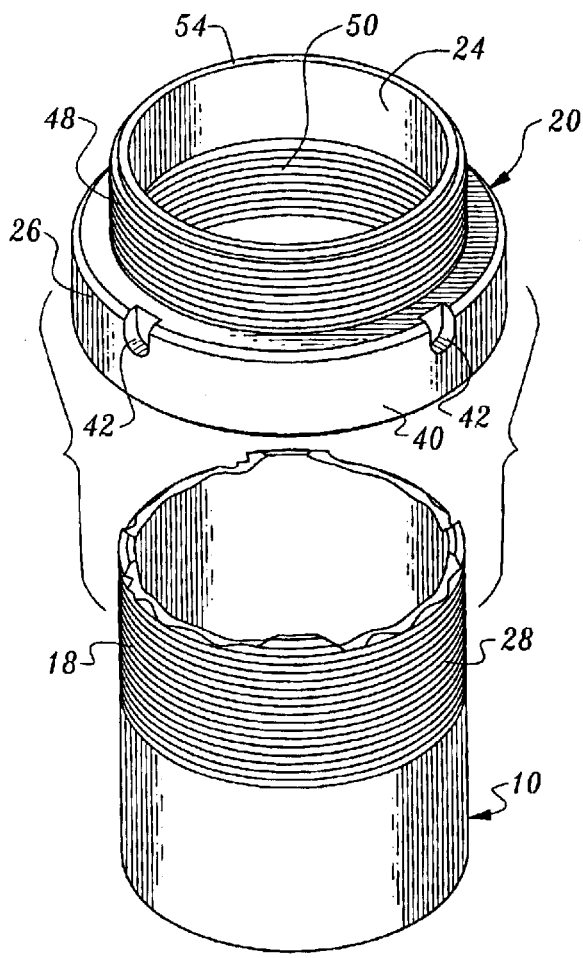
FIG. 2 is a perspective view of the riser adaptor prior to installation on the upper threaded end of the riser.
Figure 5A:
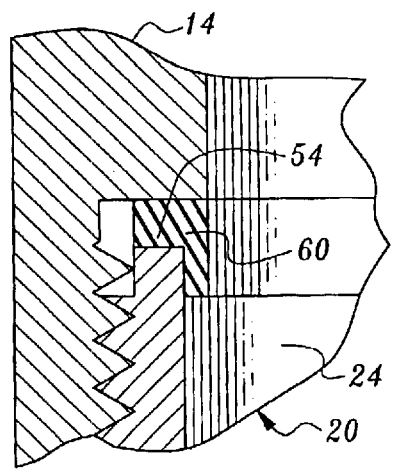
FIG. 5A is a greatly enlarged, cross-sectional view illustrating segments of an upper portion of the riser adaptor, an O-ring and structure with which the adaptor forms a seal.
Figure 5B:
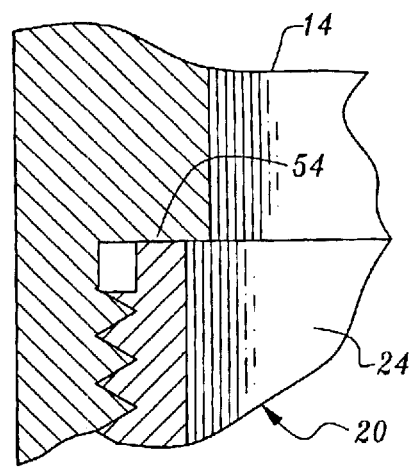
FIG. 5B is a view similar to FIG. 5A, but with the O-ring eliminated and the adaptor distal end directly bearing against the structure to form a seal.
Figure 3:
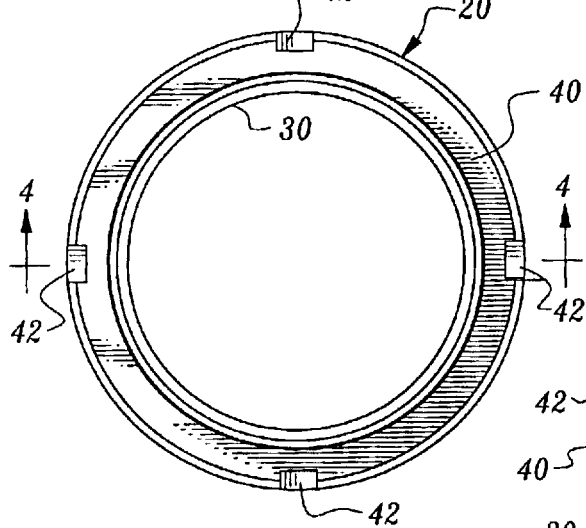
FIG. 3 is a top, plan view of the riser adaptor.
Figure 4:
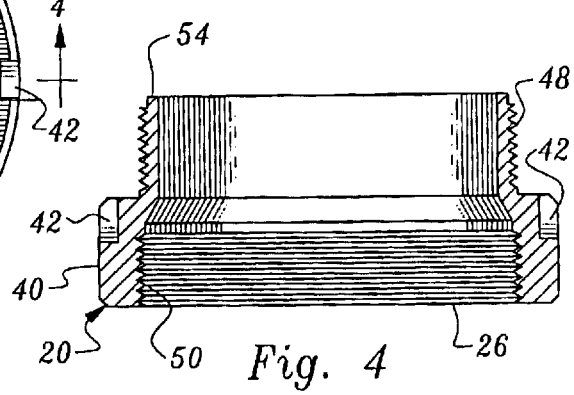
FIG. 4 is a cross-sectional view taken along the line 4—4 in FIG. 3.

As indicated above, it is common practice to field thread risers. This can and often does create imperfections and irregularities at the upper distal end of the riser. In FIG. 2 these imperfections and irregularities have been somewhat exaggerated. A non-smooth riser distal end or rim of a riser can result in leakage at the location of threaded interconnection between the upper end of the riser and structure threadedly connected thereto. For purposes of illustration, the structure shown is swivel adaptor/nozzle receptacle 14 of the type shown in my U.S. Pat. No. 6,517,356. In FIG. 1 the structure 14 is shown in phantom. In FIGS. 5A and 5B only a portion of the structure (shown in solid lines) is illustrated.

According to the teachings of the present invention a threaded riser adaptor 20 is threadedly attached to the externally threaded upper riser end 12 and employed to attach structure such as nozzle receptacle/swivel adaptor 14 to the riser in a leak-proof fashion.

The threaded riser adaptor 20 is of integral construction, preferably being formed of steel or other suitable metal.

The threaded riser adaptor has an upper externally threaded riser adaptor portion 24 for threaded engagement with internal threads of structure 14 with the upper end of the adaptor forming a liquid-tight seal with the structure. The threads of the upper externally threaded riser adaptor portion are straight pipe threads corresponding to straight internal pipe threads of the structure.

The threaded riser adaptor also includes a lower internally threaded riser adaptor portion 26 receiving the external threads 28 of the upper riser end, securing the threaded riser adaptor to the riser. The threaded riser adaptor 20 defines a liquid passageway 30 communicating with the interior of the riser. The threads of the lower internally threaded riser adaptor are tapered National Pipe Threads (NPT) corresponding to those of the riser. The threads 28 of the riser and the threads of the internally threaded riser adaptor portion 26 form a second liquid-tight seal without the upper rim of the riser abutting against the adaptor.

The threaded riser adaptor includes an outwardly projecting collar 40 adjacent to and below the level of the external threads of the upper externally threaded riser adaptor portion. The collar 40 defines spaced indents 42 for receiving a torque tool (not shown) of any suitable construction employed to selectively alternatively tighten or loosen the threaded riser adaptor relative to the externally threaded upper riser end. The collar 40 has an upper collar surface and the spaced indents 42 project downwardly from the upper collar surface.

The distal end or rim 54 of the upper externally threaded riser adaptor portion 24 surrounds the liquid passageway 30, the distal end 54 being circular-shaped and having a smooth bearing surface for cooperation with structure 14 to form the liquid-tight seal between the upper externally threaded riser adaptor portion and the structure.

If desired, an O-ring such as O-ring 60 in FIG. 5A may be employed between the distal end 54 and the structure 14. However, direct engagement between the distal end 54 and the structure 14, as shown in FIG. 5B, can also result in creation of a fluid-tight seal.

The invention claimed is:

1. In combination:

a hollow riser leading to an underground liquid storage tank, said riser having a riser liquid passageway, an externally threaded upper riser end with external tapered threads and an upper rim defining a riser opening communicating with said riser liquid passageway;

a structure disposed above said riser, said structure defining a structure interior and having a lower, open structure end communicating with said structure interior, said structure further having internal straight pipe threads extending upwardly from said lower, open structure end and terminating at an inwardly projecting shoulder of said structure;

an annular seal in fluid-tight engagement with said inwardly projecting shoulder above the internal straight pipe threads of said structure; and a threaded riser adaptor of integral construction having an upper externally threaded riser adaptor portion including external straight pipe threads in threaded engagement with the internal straight pipe threads of said structure and forming a first liquid-tight seal therewith and a lower internally threaded riser adaptor portion including internal tapered threads receiving the external tapered threads of said externally threaded upper riser end and securing the threaded riser adaptor to said riser, said threaded riser adaptor defining a riser adaptor liquid passageway communicating with both the riser liquid passageway and the structure interior to allow the flow of liquid therebetween, and the external tapered threads of said externally threaded upper riser end and the internal tapered threads of said lower internally threaded riser adaptor portion being in fluid-tight engagement and forming second liquid-tight seal therebetween without the upper rim of the riser abutting against the threaded riser adaptor, said upper externally threaded riser adaptor portion having a distal end surrounding the riser adaptor liquid passageway, said distal end being circular-shaped and having a smooth bearing surface bearing against said annular seal and in fluid-tight relationship therewith, said threaded riser adaptor and seal cooperable to maintain a fluid-tight interconnection between said riser and said structure even if the riser is damaged or irregular at or closely adjacent to the rim thereof.

2. The combination according to claim 1 wherein said threaded riser adaptor includes an outwardly projecting collar adjacent to and below the level of the external straight pipe threads of said upper externally threaded riser adaptor portion, said collar defining spaced indents for receiving a torque tool employed to selectively alternatively tighten or loosen said threaded riser adaptor relative to said externally threaded upper riser end, said collar having an upper collar surface and said spaced indents projecting downwardly from said upper collar surface.

* * * * *